US010208359B2

(12) United States Patent
Rowe

(10) Patent No.: US 10,208,359 B2
(45) Date of Patent: Feb. 19, 2019

(54) SOLID MOLASSES COMPOSITION

(71) Applicant: IAF SCIENCE HOLDINGS LIMITED, Hamilton (BM)

(72) Inventor: John Lawrence Rowe, Charlottetown (CA)

(73) Assignee: IAF SCIENCE HOLDINGS LIMITED, Hamilton (BM)

( * ) Notice: Subject to any disclaimer, the term of this patent is extended or adjusted under 35 U.S.C. 154(b) by 0 days.

(21) Appl. No.: 15/209,134

(22) Filed: Jul. 13, 2016

(65) Prior Publication Data

US 2017/0114423 A1 Apr. 27, 2017

Related U.S. Application Data

(63) Continuation of application No. 14/769,008, filed as application No. PCT/CA2014/050112 on Feb. 19, 2014.

(60) Provisional application No. 61/766,401, filed on Feb. 19, 2013.

(51) Int. Cl.
*C13B 50/00* (2011.01)
*C13B 50/02* (2011.01)

(52) U.S. Cl.
CPC .......... *C13B 50/006* (2013.01); *C13B 50/008* (2013.01); *C13B 50/02* (2013.01)

(58) Field of Classification Search
None
See application file for complete search history.

(56) References Cited

U.S. PATENT DOCUMENTS

| 1,548,293 | A | * | 8/1925 | Wilkins | A23K 10/33 127/29 |
| 1,893,434 | A | | 1/1933 | Muller | 185/300 |
| 1,983,434 | A | * | 12/1934 | Black | C13B 50/008 127/55 |
| 2,089,062 | A | | 8/1937 | Hougland | 159/11.1 |
| 2,707,151 | A | * | 4/1955 | Martin | A23K 10/33 426/471 |
| 3,263,592 | A | | 8/1966 | Hickey et al. | 99/339 |
| 3,880,668 | A | * | 4/1975 | Miller | B01D 1/22 127/16 |
| 3,961,081 | A | * | 6/1976 | McKenzie | A23K 10/33 127/29 |

(Continued)

FOREIGN PATENT DOCUMENTS

| CA | 1007152 | 3/1977 |
| CA | 1031212 | 5/1978 |

(Continued)

OTHER PUBLICATIONS

International Search Report and Written Opinion for PCT/CA2014/050112, dated Apr. 17, 2014.

*Primary Examiner* — Melvin C. Mayes
*Assistant Examiner* — Stefanie J Cohen
(74) *Attorney, Agent, or Firm* — Norton Rose Fulbright US LLP

(57) ABSTRACT

The present disclosure relates to a solid molasses product having a low water content. The solid molasses product retains the physical and palatable properties of untreated/hydrated molasses while having a prolonged shelf-life. It can be advantageously used to sweeten beverages (such as hot beverages) and in the manufacture of pharmaceutical compositions, confectionery as well as animal feed.

9 Claims, 1 Drawing Sheet

(56) References Cited

U.S. PATENT DOCUMENTS

| | | | |
|---|---|---|---|
| 3,985,912 A * | 10/1976 | Glabe | C13B 50/008 |
| | | | 127/29 |
| 4,737,377 A | 4/1988 | Lane et al. | 426/635 |
| 5,908,634 A * | 6/1999 | Kemp | A23K 40/10 |
| | | | 424/442 |
| 7,521,076 B1 | 4/2009 | Wenger | 426/510 |
| 2012/0034309 A1 | 2/2012 | Rowe | 424/537 |

FOREIGN PATENT DOCUMENTS

| | | |
|---|---|---|
| EP | 1927291 | 6/2008 |
| WO | WO 2012083208 | 6/2012 |

\* cited by examiner

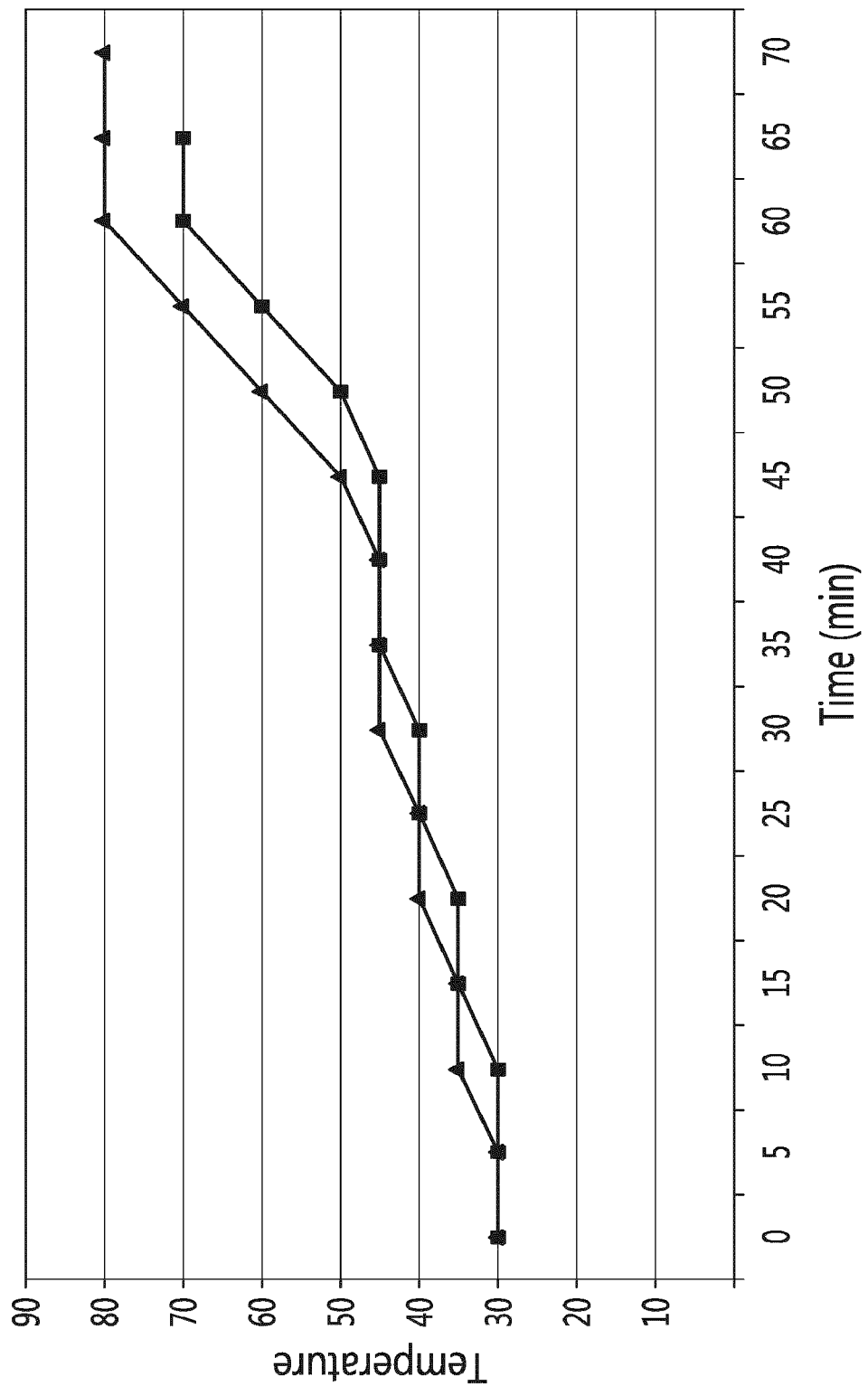

SOLID MOLASSES COMPOSITION

CROSS-REFERENCE TO RELATED APPLICATIONS

This application is a continuation of U.S. patent application Ser. No. 14/769,008 filed Aug. 19, 2015, now abandoned, which is a national phase application under 35 U.S.C. § 371 of International Application No. PCT/CA2014/050112 filed Feb. 19, 2014. which claims priority to U.S. provisional patent application 61/766,401 filed on Feb. 19, 2013. The entire contents of each of the above-referenced disclosures are incorporated herein by reference without disclaimer.

TECHNOLOGICAL FIELD

This present disclosure relates to solid molasses products having a low water content. The molasses product described herein is solid, translucent and glassy at room temperature. The organoleptic and physical characteristics of the solid molasses product are very similar to those of untreated molasses.

BACKGROUND

Molasses is a viscous by-product of the refining of sugar cane juice, grapes or sugar beets into sugar. The properties of molasses obtained depend on the maturity of the source plant, the amount of sugar extracted and the method employed.

To make molasses from sugar cane, a juice is first extracted (usually by crushing or mashing, but also by cutting the plant). The juice is then boiled to concentrate it and promote the crystallisation of the sugars. The crystals are removed from this boiled solution to provide a first molasses (also referred to as light or fancy molasses). The first molasses has the highest sugar content and moisture content.

Second molasses is created from a second boiling and sugar extraction. Referred to as "medium" molasses, it has a slight bitter tinge to its taste, has a lower sugar and moisture content (e.g., it is more viscous) than light molasses.

The third boiling of the sugar syrup (and removal of sugar crystals) yields black strap molasses (also referred to as "dark" molasses), known for its robust flavor. In such molasses, the majority of sucrose from the original juice has been crystallised and removed. Unlike refined sugars, black strap molasses contains trace amounts of vitamins and significant amounts of several minerals.

Molasses made from sugar beet is different from sugar cane molasses. Only the syrup left from the final crystallization stage is called molasses; intermediate syrups are referred to as high green and low green, and these are recycled within the crystallisation plant to maximize extraction. Beet molasses is about 50% sugar by dry weight, predominantly sucrose, but also contains significant amounts of glucose and fructose. The non-sugar content includes many salts, such as calcium, potassium, oxalate, and chloride. It also contains the compounds betaine and the trisaccharide raffinose. These are either as a result of concentration from the original plant material or as a result of chemicals used in the processing, and make it unpalatable to humans. Hence it is mainly used as an additive to animal feed (called "molassed sugar beet feed") or as a fermentation feedstock.

It is know in the art that reducing the water content of molasses (which typically has an initial water content of between about 28% to 35% (w/w) to around 5% (w/w)) is relatively routine and typically used for animal feed (U.S. Pat. No. 2,089,062 or U.S. Pat. No. 3,961,081, for example). However, it has also been previously taught in the art that reducing the water content of molasses to below 1% (w/w) is challenging, especially because the heat used to dehydrate the product tends to caramelize, invert, burn and/or crystallize the sugars of the molasses product and therefore, generates unwanted/unpleasant organoleptic properties (U.S. Pat. No. 1,983,434). Further, some dehydration processes, due to the use of a temperature higher than 121° C. (for examples, those described in PCT/US2011/065567 published under WO 2012/083208 as well as in U.S. Pat. No. 4,737,377), can also cause the destructions of nutritional elements present in the molasses (vitamin $B_6$, for example).

Since the applications of molasses in a liquid form are limited and costly, it would be highly desirable to be provided with a molasses product processed into a solid form and therefore, having a low water (e.g. moisture) content. In addition, it would also be desirable to be provided with a molasses product which does exhibit the flavor profile of the liquid untreated/hydrated molasses. It would also be desirable to obtain a dehydrated molasses product which is a flowable liquid at elevated temperature (in order to facilitate handling of the product) and a solid room temperature (in order to facilitate processing and use of the product). It would also be desirable to be provided with a process for obtaining such molasses product and which would preferably avoid foaming of the treated molasses during the water removal step as well as limit the degradation of nutritional elements (such as vitamins and minerals) present in the molasses.

BRIEF SUMMARY

According to a first aspect, the present disclosure provides a solid molasses product consisting essentially of a molasses and having a moisture content equal to or less than about 0.5% (w/w). In an embodiment, the moisture content is equal to or less than about 0.3%, than about 0.1%, than about 0.05% or than about 0.01%. In another embodiment, the molasses is a sugar cane molasses. In still another embodiment, the sugar cane molasses is a light or fancy molasses. In yet a further embodiment, the solid molasses is produced by a process comprising submitting the light or fancy molasses to a vacuum of at least 28 inHg while applying a raise in temperature to at most 80° C. and for a period of time of at least 70 minutes so as to obtain a dehydrated molasses product. In another embodiment, the sugar cane molasses is a medium molasses. In yet a further embodiment, the solid molasses is produced by a process comprising submitting the medium molasses to a vacuum of at least 28 inHg while applying a raise in temperature to at most 80° C. and for a period of time of at least 70 minutes so as to obtain a dehydrated molasses product. In yet another embodiment, the sugar cane molasses is a black strap molasses. In yet a further embodiment, the solid molasses product is produced by a process comprising submitting the dark strap molasses to a vacuum of at least 28 inHg while applying a raise in temperature of the molasses to at most 70° C. and for a period of time of at least 65 minutes so as to obtain a dehydrated molasses product. In an embodiment, the solid molasses product is glossy at room temperature. In still another embodiment, the solid molasses product described herein is for use as a sweetener.

According to a second aspect, the present disclosure provides a molasses composition comprising the solid molasses product described herein and at least one additive. In the context of the present disclosure, it is understood that the at least one additive is added to the molasses composition after the dehydration process. In an embodiment, the at least one additive comprises a flavor (such as, for example, spearmint, eucalyptus, menthol and/or lemon). In another embodiment, the at least one additive comprises a preservative. In yet another embodiment, the composition is a confectionery. In another embodiment, the composition is a pharmaceutical composition. In yet another embodiment, the composition is an animal feed.

According to a third aspect, the present disclosure provides a process for obtaining a molasses product consisting essentially of a molasses and having a moisture content equal to or less than about 0.5% (w/w). Broadly, the process comprises: (a) heating an initial molasses to a temperature of at least 70° C. while applying a vacuum of at least 28 inches of Hg so as to provide a treated molasses; and (b) maintaining the treated molasses to a temperature of at least 70° C. and under a vacuum of at least 28 inches of Hg until the moisture content of the treated molasses reaches at least 0.5% (w/w) so as to obtain a dehydrated molasses product. In an embodiment, the process further comprises: (c) cooling the deposited dehydrated molasses product at room temperature so as to obtain a glossy molasses product. In still another embodiment, the process further comprises, prior to step (c) and after step (b), depositing the dehydrated molasses product in a mold. In still another embodiment, the process further comprises: (d) processing the molasses product into a powder. In yet another embodiment, the process further comprises placing the solid molasses product in a water-impermeable package. In an embodiment, the molasses is a sugar cane molasses. In yet another embodiment, the sugar cane molasses is a black strap molasses. In still a further embodiment, the process is adjusted so that the temperature of step (a) and of step (b) is at least 80° C. In such embodiment, the sugar cane molasses can be a light (fancy) molasses. In still a further embodiment, the process is adjusted so that the temperature of step (a) and of step (b) is at least 75° C. In such embodiment, the sugar cane molasses can be medium molasses.

BRIEF DESCRIPTION OF THE DRAWING

Having thus generally described the nature of the invention, reference will now be made to the accompanying drawing, showing by way of illustration, a preferred embodiment thereof, and in which:

FIG. 1 is a line graph providing the temperature (in ° C.) in function of time (in minutes) for embodiments of processes (conducted under a vacuum of 28 inches of Hg) for obtaining a solid molasses product from light (fancy) molasses (▲) or black strap molasses (■).

DETAILED DESCRIPTION

In accordance with the present disclosure, there is provided a solid molasses product having a moisture content of less than 0.5% (w/w). The molasses product described herein consists essentially of a liquid molasses to which water has been removed. It is a pure molasses product to which no additives, binders, sugars have been added during the dehydration process. The molasses product is not limited to any specific manufacturing technique. However, since the molasses product retains the color, the organoleptic characteristics and the taste of untreated molasses, care must be taken in selecting an appropriate manufacturing technique that will preserve the original molasses color, organoleptic characteristics and taste. In addition, since dehydrated molasses has a tendency to not to set into a solid, even at room temperature, care should be taken in selecting an appropriate manufacturing technique that will allow the dehydrated end product to be cooled to a solid (at room temperature). Further, since molasses has a tendency develop a burnt flavor when heat is applied, care should be taken in selecting an appropriate manufacturing technique that will not allow the dehydrated end product to develop a burnt flavor or taste. In still another embodiment, since molasses comprises nutritional elements which are sensitive to heat, care should be taken in selecting an appropriate manufacturing technique that will allow the dehydrated end product to retain these nutritional elements (and, in an embodiment, retain a substantial amount of these nutritional elements. In yet other embodiments, since heated molasses has a tendency to lose the appropriate flowability and foam during manufacturing, care should be taken to avoid the lost in flow or foaming during the preparation of the solid molasses compositions.

As it will be shown herein, the solid molasses products retain the organoleptic properties (besides an increase in sweetness) of the original molasses used in their manufacture. The solid molasses products are manufactured so as not to substantially be deprived of minerals, vitamins and/or volatile components which are present in the original molasses used in their confection. As used herein, the term "not substantially deprived" refers to the property of the solid molasses product to retain the majority (more than 50%, more than 60%, more than 70%, more than 80% or more than 90%) of the minerals, vitamins and/or volatile components present in the initial molasses used in their manufacture. In some embodiments, the solid molasses product does not exhibits a burnt flavor and is palatable for humans.

As used herein, the term "molasses" is referred to a syrup obtained during the refinement of sugars from the juice of a plant. Broadly, the juice of the plant is pumped into an evaporator that boils it until the water dissipates and the syrup remains. Eventually, the sugar crystallizes out of the syrup, creating a substance called "massecuite". The "massecuite" is poured into a centrifuge to further separate the raw sugar crystals from the syrup. In the centrifuge, the sugar crystals dissociate from the syrup that is being spun at a significant force. This remaining syrup is molasses (containing the uncrystallized sugars), and it is forced out through holes in the centrifuge.

Molasses comprises a sucrose (as a major component), glucose and fructose. In some embodiments, it can also comprise minor amounts of raffinose and dextran. Depending on the process used to obtain molasses, molasses can also contain vitamins (such as vitamin $B_6$, thiamin and/or niacin) as well as minerals (such as iron, calcium, potassium, magnesium, manganese and/or sodium). The water content of the molasses (prior to its transformation into the solid molasses product) is generally between about 28% and 35% (w/w). Molasses usually contain very little fat and generally do not contain protein. Molasses also comprises volatile compounds such as, but not limited to, aliphatic esters, simple aliphatic acids, aromatic esters, aldehydes, and furan derivatives.

Two species of plants are predominantly used to produce molasses: the sugar cane (*Saccharum officenarum*) as well as the sugar beet (*Beta vulgaris*). In an embodiment, the molasses products and associated processes described herein are manufactured from molasses which are destined for human consumption. The molasses that can be used in the product/compositions described herein is not limited to a single type of molasses from a single plant source. In an embodiment, the solid molasses product is derived from a single type of molasses (sugar cane, for example). However, in other embodiments, it may be preferable to produce a solid molasses product from more than one type of molasses.

The molasses that can be used in the products, compositions and processes described herein is not further treated prior to the dehydration step. For example, the molasses that can be used in the products, compositions and processes described herein does not include fractionated, enzymatically-treated, separated, filtered and/or inverted molasses. In addition, it is preferable that the molasses that is included in the products or composition be, prior to dehydration, substantially free of sugar/carbohydrate crystals.

The initial molasses is submitted to a process in order to reduce its moisture content (e.g., dehydration step, such as, for example, spray-drying, vaccum drying, etc.) to at least about (and below) 0.5% to obtain a molasses product in solid form. Even though the molasses product described herein can be obtained using various processes, in one advantageous embodiment, it is possible to use a combination of vacuum and heat treatments to remove most of the water content of the original untreated molasses. As used herein "solid molasses product" refers to a substance derived from molasses that is not liquid and that can be used as a source of nourishment. In embodiments, the solid molasses product is translucent, glossy and not tacky to the touch.

After the dehydration process has been completed, the dehydrated molasses product is a flowable liquid at elevated temperatures (for example, at temperature higher than 50° C.) allowing it in being easily handled (e.g., deposited in a mold). After the dehydration process has been completed, the molasses product is a cooled into a translucent solid at room temperature (e.g., at a temperature between 20 to 30° C.) allowing it in being easily handled or further processed. As it will be shown below in the Examples section, a dehydrated molasses-containing product can be difficult to manipulate (even at room temperature) because it does not necessarily set into a solid form.

In yet another embodiment, the molasses product described herein is a pure and/or dried molasses product. As used herein, the term "pure" molasses product refers to a product that is free or substantially free from exogenous additives (such as, for example, exogenous polysaccharide (trehalose, sucrose, glucose isomalt, binders or preservatives)) with respect to the original liquid molasses combination.

In an embodiment, the molasses product described herein is a dried molasses product. A "dried" molasses product refers to the fact that the moisture content is limited to no more than 0.5% w/w.

The person skilled in the art can easily assess the percentage of moisture in a molasses product using methods readily known in the art. The moisture content of a food product is usually defined through the following formula:

$$\% \text{ moisture} = (m_w/m_{sample}) \times 100$$

In this formula, $m_w$ is the mass of the water and $m_{sample}$ is the mass of the sample. The mass of water is related to the number of water molecules ($n_W$) by the following formula:

$$M_w = n_w M_w / N_A,$$

In this formula, $M_w$ is the molecular weight of water (18.0 g per mole) and $N_A$ is Avodagro's number ($6.02 \times 10^{23}$ molecules per mole). In principle, the moisture content of a molasses product can therefore be determined accurately by measuring the number or mass of water molecules present in a known mass of sample. When determining the moisture content of a food, it is important to prevent any loss or gain of water. For this reason, exposure of a sample to the normal atmosphere, ambient temperature and excessive temperature fluctuations, should be minimized.

In one embodiment, a spectroscopic method can be used to determine the moisture content of the molasses product. Spectroscopic methods utilize the interaction of electromagnetic radiation with materials to obtain information about their composition, e.g., X-rays, UV-visible, NMR, microwaves and infra-red (IR). The spectroscopic methods developed to measure the moisture content of foods are based on the fact that water absorbs electromagnetic radiation at characteristic wavelengths that are different from the other components in the food matrix. Microwave and infrared radiation are absorbed by materials due to their ability to promote the vibration and/or rotation of molecules. The analysis is carried out at a wavelength where the water molecules absorb radiation, but none of the other components in the food matrix do. A measurement of the absorption of radiation at this wavelength can then be used to determine the moisture content: the higher the moisture content, the greater the absorption. Instruments based on this principle are commercially available and can be used to determine the moisture content in a few minutes or less.

In another embodiment, a chemical reaction, such as a colometric reaction, can be used for the determination of moisture in the molasses product. The Karl Fischer titration is often used for determining the moisture content of foods that have low water contents (e.g., dried fruits and vegetables, confectionery, coffee, oils and fats). It is based on the following reaction:

$$2H_2O + SO_2I_2 \rightarrow H_2SO_4 + 2HI$$

This reaction was originally used because HI is colorless, whereas $I_2$ is a dark reddish brown color, hence there is a measurable change in color when water reacts with the added chemical reagents. Sulfur dioxide and iodine are gaseous and would normally be lost from solution. For this reason, the above reaction has been modified by adding solvents (e.g., $C_5H_5N$) that keep the $S_2O$ and $I_2$ in solution, although the basic principles of the method are the same. The food to be analyzed is usually placed in a beaker containing solvent and is then titrated with Karl Fischer reagent (a solution that contains iodine). While any water remains in the sample, the iodine reacts with it and the solution remains colorless (HI), but once all the water has been used up, any additional iodine is observed as a dark red brown color ($I_2$). The volume of iodine solution required to titrate the water is measured and can be related to the moisture content using a pre-prepared calibration curve. The precision of the technique can be improved by using electrical methods to follow the end-point of the reaction, rather than observing a color change.

One particular advantage of the solid molasses product described herein is that, during its dehydration process, no additives are being added to facilitate water removal, to prevent the crystallization of the sugars, to facilitate flowing of the dehydrated product into molds, to assist in the formation of a non-tacky solid substance nor to limit the adhesion of the product to its packaging membrane.

In an embodiment, the solid molasses product can be packaged under conditions to limit water reabsorption. When the molasses product is wrapped in a water-impermeable package, its storage time is of about three years or even more (depending on the WVTR of the package). During storage, the product does not substantially reabsorb water and as such, its water content is substantially constant. As used herein, a molasses product that does not "substantially" reabsorb water is a molasses product that possesses a water content of less than about 0.5% w/w during its storage. When the water content of the molasses product exceeds 0.5% w/w, the molasses product becomes tacky.

Another advantage of the solid molasses product described herein is that the majority of the sugars present are in an uncrystallized form. As used herein, the term "uncrystallized" refers to the absence of sugar crystals that can be felt in the mouth and/or visible to the naked eye. The molasses product has a smooth texture and does not contain granulated sugar crystals which can be seen by the naked eye or be felt in the mouth. In addition, the process used to dehydrate the molasses does not favor or increase the appearance and/or maintenance of sugar crystals in the solid molasses product.

A further advantage of the molasses product described herein is that, once cooled at room temperature (but prior to other processing steps), it is a translucent product having the color characteristics of the original molasses (e.g., shades of brown).

Another advantage of the molasses product described herein is that, once cooled at room temperature (but prior to other processing steps), it has, as a predominant flavor, the organoleptic properties of the original molasses (flavor, intensity, mouth feel). Upon water evaporation, it is assumed that the solid molasses product will have an increase in flavor intensity (with respect to the original untreated molasses) and that the sweetness level of product could be perceived as different (e.g., heightened) than in the untreated liquid molasses.

Another advantage of the molasses product described herein is that, once dehydrated, it still contains the majority of the volatile components, vitamins and/or minerals present in the original untreated molasses.

As indicated above, the solid molasses product is not limited to a specific manufacturing technique. In one advantageous embodiment and as shown below, the liquid molasses is submitted to vacuum drying to lower its water content and generate the molasses product. The liquid molasses is not supplemented with an exogenous source of additive or processed prior to its dehydration. The time, temperature and pressure variables used should be designed to generate a solid molasses product having similar organoleptic characteristics as the original liquid (e.g., hydrated) molasses. The time, temperature and pressure variables used should also be designed to generate a dehydrated molasses that is in liquid form at elevated temperature (e.g., at temperatures above 60° C. and below 90° C.) in order to facilitate/enable its subsequent processing, and in a solid form at room temperature (e.g., at temperatures between 20° C. to 30° C.).

In an embodiment, the molasses can be heated from ambient temperature to a temperature equal to or less than 80° C. (e.g., less than 75° C., 70° C. or 65° C., for example). Simultaneously, a pressure of 28 inHg is simultaneously applied to the heated molasses. This vacuum is maintained until the moisture content reaches a specific threshold (for example, equal to or less than 0.5%, 0.4%, 0.3%, 0.2%, 0.1%, 0.09%, 0.08%, 0.07%, 0.06%, 0.05%, 0.04%, 0.03%, 0.02% or 0.01%), depending on the final application of the product. Depending on the moisture content of the original molasses, the dehydration process for the production of the solid molasses product can last at least 60 minutes, at least 65 minutes, at least 70 minutes or at least 75 minutes. The dehydration process is conducted under constant stirring (or any other techniques known in the art) to evenly distribute the temperature in the molasses that is being dehydrated to avoid burning of the dehydrated molasses or foaming of the molasses composition that is being dehydrated. As it is known in the art, the temperature, vacuum and time parameters can be modified to reach the desired temperature. These parameters will also depend on the amount of molasses that is being processed as well as the content of original the liquid molasses (such as its moisture content). For example, for light/fancy molasses (which has the highest sucrose content and the highest water content), it is preferable to use a higher temperature (e.g., increase the temperature of the molasses during the dehydration process to at least 80° C.) and a longer dehydration period (e.g., about 70 minutes) to obtain the solid molasses product. In comparison, when a black strap molasses is used, it is preferable to use a lower temperature and a slower increase in temperature (e.g., increase the temperature of the molasses during the dehydration process to at least 70° C.) and a shorter dehydration period (e.g., about 65 minutes) to obtain the solid molasses product).

Once the solid molasses product has been dehydrated (e.g., reached its moisture content of equal to or less than 0.5%), the vacuum is removed and it is cooled at room temperature. In some embodiments, the dehydrated molasses product can be deposited into molds. The deposition into mold is preferably performed when the dehydrated molasses product is at a temperature higher than the temperature it sets into a solid, for example, at temperatures equal to or higher than 50° C. The cooled solid molasses product can be manufactured to any size that is convenient for the end-use, for example in formats ranging from µg to kg.

Optionally, the solid molasses product can be packaged. Because of the hygroscopic nature of the dehydrated molasses product, it will tend to reabsorb water if it is stored in a humid environment. For example, depending on the relative humidity of the environment, if the product is left at ambient temperature, within a couple of days, it will tend to become tacky and, within a couple of weeks, it will tend to become sticky. As such, in order to prolong the shelf life of the product, it can be packaged in a water-impermeable membrane. As used herein, a "water-impermeable package" or "water-impermeable membrane" refers to a material that limits the transmission of water vapor. In an embodiment, the water vapor transmission rate (WVTR) of the "water-impermeable" package or membrane is below 0.1 gm/100 in$^2$ or below about 0.01 gm/100 in$^2$. Because the molasses product can be used as a food or as a food additive, the package can be of food or pharmaceutical grade. Further, since the package can optionally be submitted to heat to form a seal it around the molasses product, the package or membrane can also be resistant to heat.

Once the solid molasses product has been obtained, it can optionally be further processed into a molasses composition. For example, in an embodiment, it is contemplated that a flavor be added to the molasses product described after it has been dehydrated (in embodiments, prior to the product setting into a solid). The added flavor may be, for example, a sweet or a savory flavor. Sweet flavors include, but are not limited to fruits (peach, pear, apple), citrus (orange, lemon, lime), berry (raspberry, strawberry, blueberry), spice (vanilla, cinnamon, clove, lavender), caramel, butterscotch, maple, mint (spearmint, menthol). Savory flavors include, but are not limited to, ginger, pepper (black, white, pink, green, hot), etc. Other flavors, such as coffee, tea, herbal tea and/or alcohol, can also be added. In an embodiment, the flavor can be derived from an oil, a powder and/or an extract (such as, for example, an alcohol extract).

In other optional or complementary embodiments, a preservative can be added to the dehydrated molasses product (after its dehydration) to prolong its self-life, delay or limit water reabsorption and/or preserve the formation of crystals. Such preservative can be an emulsifier, an anti-sticking agent and/or a stabilizer, including, but not limited to bee wax, carnauba wax, a sugar (such as trehalose and/or sucrose), a sugar alcohol or polyol (such as, for example, methanol, ethylene glycol, glycerol, erythritol, threitol, arabitol, ribitol, xylitol, mannitol, sorbitol, galactitol, iditol, volemitol, fucitol, inositol, maltitol, lactitol, isomalt, maltotriitol, maltotetraitol and/or polyglycitol) or other food/pharmaceutical processing aids.

The solid molasses product can be used without any further processing, usually as a sweetener in food applications, both for human as well as animal consumption (e.g., animal feed). However, the solid molasses product can be further processed for use in other food applications (such as confectionary, dessert topping and/or sweet ingredient) as well as in pharmaceutical applications (such as throat lozenges). In such instances, the solid molasses product can be further powdered, crushed, ground and/or granulated for these additional applications.

Particles can thus be made from the solid molasses product and used in various applications. For example, when a coarser particle is required, the solid molasses can be processed into a "granular" form particles having a size distribution that ranges between about 0.25 and 2 mm. On the other hand, when a finer particle is needed, the solid molasses product can be processed into a "powder" form particles having a size distribution that ranges between 62.5 to 125 μm. The size distribution of the particles can be assessed by the techniques known in the art, such as the Gates-Gaudin-Schuhmann method, the Rosin-Rammler method, the modified Gaudin-Meloy method, the Log-normal method and/or the modified beta method. Similar to what has been indicated above for the solid molasses products, the particles of the solid molasses product can also be packaged in a water-impermeable membrane to slow down, delay or prevent water reabsorption.

The molasses product or the molasses composition as described herein can be advantageously used to sweeten a beverage. When the solid molasses product is placed in an aqueous-based beverage, it reabsorbs water and dissolves to sweeten the beverage. The application of the molasses product is not limited to a specific type of beverage or to beverages having a specific temperature.

Because of the excellent palatable properties of the solid molasses, the molasses product or the molasses composition described herein can be further processed into a confectionery. In order to introduce the solid molasses product into a confectionery, and as indicated above, it can be physically processed (crushed into granules, powdered and/or coated in a solution) and/or flavors can be added. Alternatively or concomitantly, the manufacturing process of the product can also be altered to introduce additional components of the confectionery.

Further, the solid molasses product can be formulated into a medicinal delivery a to improve the taste of pharmaceutical composition.

The present invention will be more readily understood by referring to the following examples which are given to illustrate the invention rather than to limit its scope.

Example I—Solid Molasses Product from Light(Fancy) Molasses

Pure light(fancy) molasses was submitted to a vacuum dehydration at a temperature of 80° C., under a vacuum of 28 inches of Hg (at T=0) as indicated in Table A as well as FIG. 1. After 80 minutes, the vacuum was released and the product was poured into molds. At the end of the process, the product was solid, glassy and having a moisture content below 0.3%.

TABLE A

Time and temperature characteristics of the dehydration process used in Example I.

| Time (mins) | Temperature (° C.) |
|---|---|
| 0 | 30 |
| 5 | 30 |
| 10 | 35 |
| 15 | 35 |
| 20 | 40 |
| 25 | 40 |
| 30 | 45 |
| 35 | 45 |
| 40 | 45 |
| 45 | 50 |
| 50 | 60 |
| 55 | 70 |
| 60 | 80 |
| 65 | 80 |
| 70 | 80 |

Example II—Solid Molasses Product from Black Strap Molasses

Black strap molasses was submitted to a vacuum dehydration at a temperature of 70° C., under a vacuum of 28 inches of Hg (at T=0) as indicated in Table B as well as FIG. 1. After 65 minutes, the vacuum was released and the product was poured into molds. At the end of the process, the product was solid, glassy and having a moisture content below 0.3%.

TABLE B

Time and temperature characteristics of the dehydration process used in Example II.

| Time (mins) | Temperature (° C.) |
|---|---|
| 0 | 30 |
| 5 | 30 |
| 10 | 30 |
| 15 | 35 |
| 20 | 35 |
| 25 | 40 |
| 30 | 40 |
| 35 | 45 |
| 40 | 45 |
| 45 | 45 |
| 50 | 50 |
| 55 | 60 |
| 60 | 70 |
| 65 | 70 |

Example III—Solid Molasses Product from Medium Molasses

Medium molasses was submitted to a vacuum dehydration at a temperature of 70° C., under a vacuum of 28 inches of Hg (at T=0) as indicated in Table C. After 70 minutes, the vacuum was released and the product was poured into molds. At the end of the process, the product was solid and glassy.

TABLE C

Time and temperature characteristics of the dehydration process used in Example III.

| Time (mins) | Temperature (° C.) |
| --- | --- |
| 0 | 30 |
| 5 | 30 |
| 10 | 30 |
| 15 | 35 |
| 2 | 35 |
| 25 | 40 |
| 30 | 40 |
| 35 | 45 |
| 40 | 45 |
| 45 | 45 |
| 50 | 50 |
| 55 | 60 |
| 60 | 70 |
| 65 | 75 |
| 70 | 75 |

Example IV—Alternative Processes for Dehydrating Molasses

In a 250 ml beaker, 200.0 g of molasses was added. As suggested in U.S. Pat. No. 3,961,081, the molasses was first heated to a temperature of 135.5° C. and then a vacuum was applied while removing heat. Once the product had cooled to a temp of 50° C., it was poured into molds to set. The final product was not a solid mass of molasses in a glass like state. Upon complete cooling the product was still in a liquid-like form.

Molasses (250.0 g) was thinly spread over a heated surface. As suggested in U.S. Pat. No. 2,089,062, as the molasses thickened, it was scraped together and then continually spread and scraped until it thickened significantly but was not scorched. The thickened molasses was poured onto a silicon mat to cool and harden. The final product was a solid mass of molasses that shattered when broken. However, the flavor has changed and has a burnt or charred characteristic which would be unpalatable to humans.

As suggested in U.S. Pat. No. 1,983,434, molasses is heated and continually agitated at constant temperature of 71.1° C. for 15 min. After the 15 min., the temperature is decreased to 60° C. Once the molasses reaches 60° C. in temperature, a vacuum is applied at 29 inHg. After 35 min., the vacuum was released and the molasses was poured onto silicon mat to cool and harden. The final product was not a solid mass of molasses in a glass like state. Upon complete cooling the product was still in a liquid-like form.

As suggested in WO2012/083208, molasses is heated to 104° C. then transferred to a flask. The molasses is stirred and vacuum pressure is applied at 28 inHg and temperature is regulated at 93° C. This step is carried out until substantial amounts of water are removed (approx 35 min. for 200 g batch size). The product was poured onto a silicon mat and cooled using a fan. The final product was not a solid mass of molasses in a glass like state. Upon complete cooling the product was still in a liquid-like form.

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. A process for obtaining a molasses product consisting essentially of a molasses and having a moisture content equal to or less than about 0.5% (w/w), said process comprising:
   (a) heating an initial molasses to a temperature of at least 70° C. while applying a vacuum of at least 28 inches of Hg so as to provide a treated molasses; and
   (b) maintaining the treated molasses to a temperature of at least 70° C. and under a vacuum of at least 28 inches of Hg until the moisture content of the treated molasses reaches at least 0.5% (w/w) so as to obtain a dehydrated molasses product.

2. The process of claim 1, further comprising (c) cooling the dehydrated molasses product at room temperature so as to obtain a glossy molasses product.

3. The process of claim 2, further comprising (d) processing the molasses product into a powder.

4. The process of claim 1, wherein the molasses is a sugar cane molasses.

5. The process of claim 4, wherein the sugar cane molasses is a black strap molasses.

6. The process of claim 1, wherein, the temperature of step (a) and of step (b) is at least 80° C.

7. The process of claim 6, wherein the molasses is light or fancy sugar cane molasses.

8. The process of claim 1, wherein the temperature of step (a) and of step (b) is at least 75° C.

9. The process of claim 8, wherein the molasses is medium sugar cane molasses.

* * * * *